United States Patent [19]

Williamson

[11] Patent Number: 5,391,020
[45] Date of Patent: Feb. 21, 1995

[54] METHOD FOR REMOVING A SUBSTANCE FROM A MEDIUM

[75] Inventor: John B. Williamson, Visalia, Calif.
[73] Assignee: SDVC, Inc., Visalia, Calif.
[21] Appl. No.: 879,838
[22] Filed: May 6, 1992
[51] Int. Cl.⁶ ................................................. B09B 3/00
[52] U.S. Cl. ................................... 405/129; 405/128; 405/258; 588/249
[58] Field of Search ................. 405/52, 128, 129, 258; 210/170, 602, 747; 47/1.01; 588/249

[56] References Cited

U.S. PATENT DOCUMENTS

| | | |
|---|---|---|
| 4,462,713 | 7/1984 | Zurcher et al. |
| 4,850,745 | 7/1989 | Hater et al. |
| 4,855,040 | 8/1989 | Kickuth ........................ 210/170 X |
| 4,927,293 | 5/1990 | Campbell |
| 4,948,297 | 8/1990 | Fleming |
| 4,962,034 | 10/1990 | Khan |
| 4,998,848 | 3/1991 | Hansen |
| 5,011,329 | 4/1991 | Nelson |
| 5,018,576 | 5/1991 | Udell et al. |
| 5,043,076 | 8/1991 | Alexander |
| 5,059,252 | 10/1991 | Renfro, Jr. |
| 5,073,257 | 12/1991 | Higa ........................... 210/170 |
| 5,106,504 | 4/1992 | Murray ......................... 210/602 |
| 5,174,897 | 12/1992 | Wengrzynek .................. 210/602 |

Primary Examiner—David H. Corbin
Attorney, Agent, or Firm—Worrel & Worrel

[57] ABSTRACT

A method for removing a substance from a medium including the steps of growing plant life in the medium to absorb the substance into the plant life, removing the plant life from the medium and thereby the substance from the medium and repeating the growing and removing steps as many times as necessary to reduce the remaining quantity of the substance in the medium to the level desired.

16 Claims, 4 Drawing Sheets

METHOD FOR REMOVING A SUBSTANCE FROM A MEDIUM

BACKGROUND OF THE INVENTION

1. Field of the Invention

The present invention relates to a method for removing a substance from a medium and, more particularly, to such a method which is particularly well suited to the removal of contaminants, such as toxic substances, from virtually any site and in situ as well as after removal of the medium to a remote location.

2. Description of the Prior Art

A disposal of waste materials is a perplexing concern to society, particularly with recognition in the scientific community that conventional practices are inadequate. These problems are compounded where the substances under consideration are toxic. In view of the fact that, until recently, no provision was publicly provided for the disposal of toxic substances, common practice called for the substances simply to be drained onto the ground. Thus, the conventional practice in industry, agriculture, at military installations, and by private parties was simply to allow such substances to be absorbed naturally into the soil. Containers were allowed to be drained of their residues into the soil. Vehicles of all types were allowed to drain onto the soil. Residues of toxic substances of virtually all types were disposed of in similar fashions with little or no concern for the long term effect thereof.

More recently the scientific community has recognized that the build up of such toxic substances in the soil constitutes an immediate, as well as long range, health hazard to both humans and animals. The exposure to a wide assortment of toxic substances is a cause, or significant contributing factor, to a wide variety of diseases and other physical ailments. Furthermore, it has become recognized that abandonment of such conventional disposal practices is not, in itself, adequate to remediate the hazards resulting from past practices. Thus, in many instances, toxins in the soil require extensive periods of time to dissipate to the point where they no longer constitute any health hazard. The periods of time required for such dissipation to take place may not be known. As a consequence, sites so contaminated must either be abandoned for as yet unknown periods of time, or must be remediated in order to become habitable. Since most such sites are to one degree or another of significant commercial value, considerable effort has been devoted to the development of reliable procedures for removing such contaminants from the soil.

One of the most obvious methods for soil remediation has simply been the removal of the soil so contaminated from the site and its disposal in toxic waste dumps devoted to the purpose. However, such removal is expensive and leaves the site unsuitable for most purposes without bringing in clean top soil to replace the contaminated soil which has been removed. There is a wide assortment of other remedial processes that have been developed directed toward the same objectives which include complex and expensive procedures which may or may not be adequate to the purpose. Such conventional procedures may further be characterized as affording uneven results due both to the uneven dispersal of the toxins in the soil as well as the uneven effect of such conventional remediation procedures upon the site.

Finally, governmental regulation has, in many instances, not permitted the abandonment of contaminated sites, but rather requires that such sites be cleansed of such contaminants by their present owners, or by those who contaminated the site, or by governmental agencies using funds set aside for the purpose.

Therefore, it has long been known that it would be desirable to have a method for removing a substance from a medium having particular utility in the removal of contaminants from soils and which is comparatively inexpensive in practice; which can be performed in large part by semi skilled personnel; which performs such remediation evenly over the area to which it is applied; and which can be performed to reduce the concentration of the substances to a level which can be calculated and which corresponds to that which is the objective of such remediation.

SUMMARY OF THE INVENTION

Therefore, it is an object of the present invention to provide an improved method for removing a substance from a medium.

Another object is to provide such a method which has particular utility in the removal of toxic substances from soils in virtually any location and without the expense associated with prior art practices.

Another object is to provide such a method which can be practiced in situ or after removal of the medium to a remote location.

Another object is to provide such a method which can be performed in substantial part by personnel having little or no training and using techniques which in themselves are familiar and thereby readily and inexpensively performed.

Another object is to provide such a method which in substantial part permits removal of toxic substances from soils while leaving in large part those constituents present required for beneficial use of the soil thereafter.

Another object is to provide such a method which can be performed for the even removal of toxic substances from extensive areas including, if necessary, vast acreages.

Another object is to provide such a method which can be performed to reduce the levels of toxins in soil to those levels prescribed as objectives in the remediation of the site.

Another object is to provide such a method which can be performed substantially to isolate the toxins in a very small volume of material for subsequent disposal while leaving the soil in place.

Another object is to provide such a method which reduces the toxins to the smallest volume of matter permitting it to be eliminated from the environment using such conventional techniques as incineration or disposal in a toxic waste dump.

Another object is to provide such a method which can be practiced largely without the acquisition of equipment required for the performance of the method.

These and other objects and advantages are achieved, in the preferred embodiments of the method of the present invention, by growing plant life in the medium to absorb the substance into the plant life, and removing the plant life from the medium and thereby the substance from the medium.

DESCRIPTION OF THE PREFERRED EMBODIMENTS

FIRST EMBODIMENT

Figure 1:
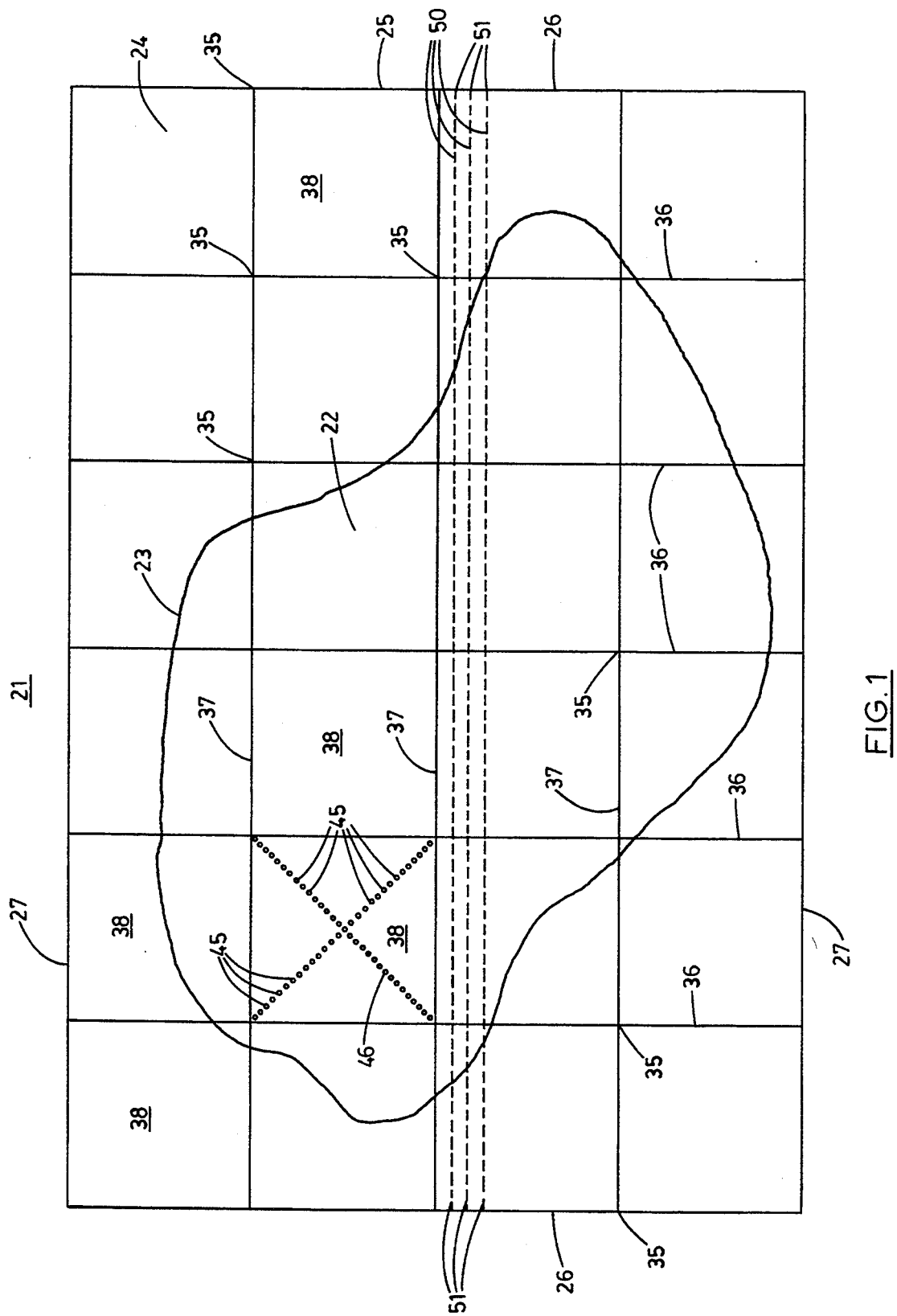
FIG. 1 is a top plan view of a site illustrating the practice of the method of the first embodiment of the present invention.
Figure 2:
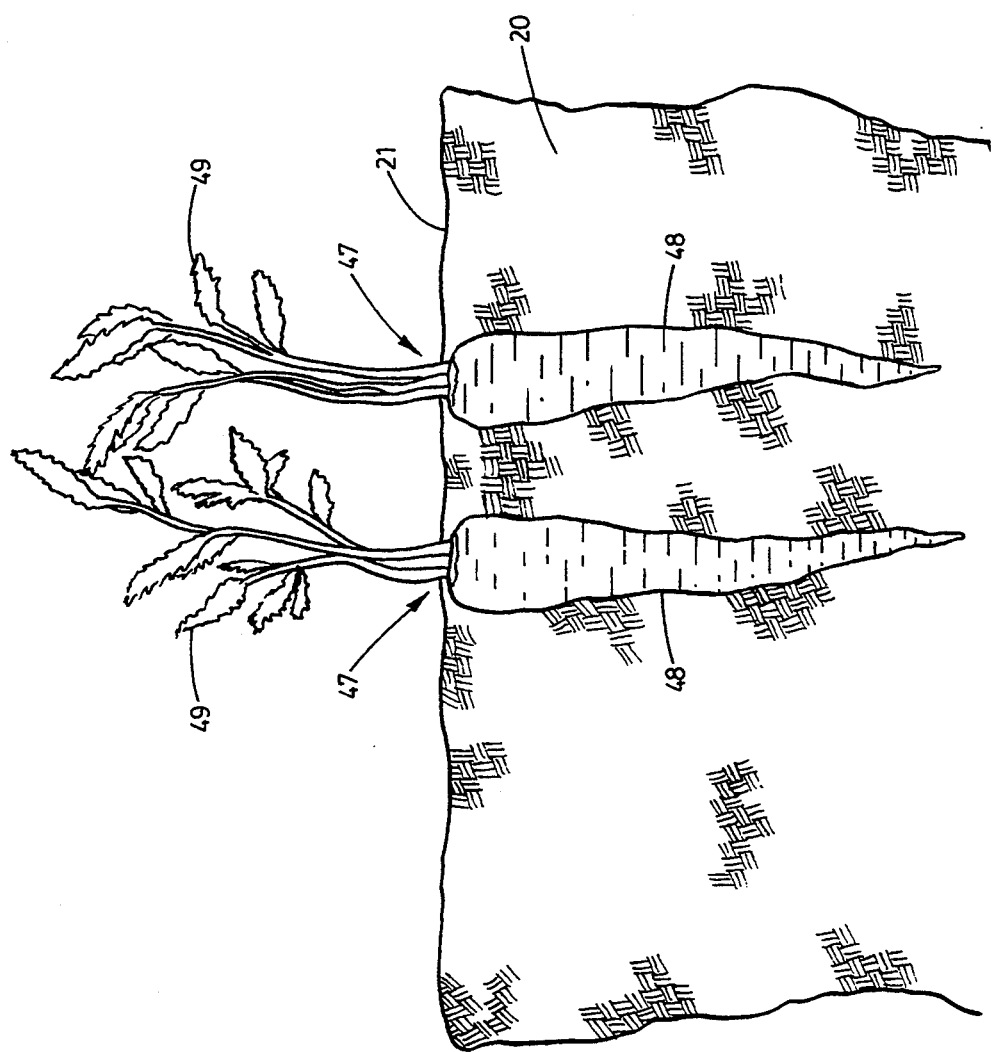
FIG. 2 is a somewhat enlarged fragmentary, vertical section of the site of FIG. 1 showing two representative carrot plants growing in the site as a result of the practice of the method of the present invention.
Figure 4:
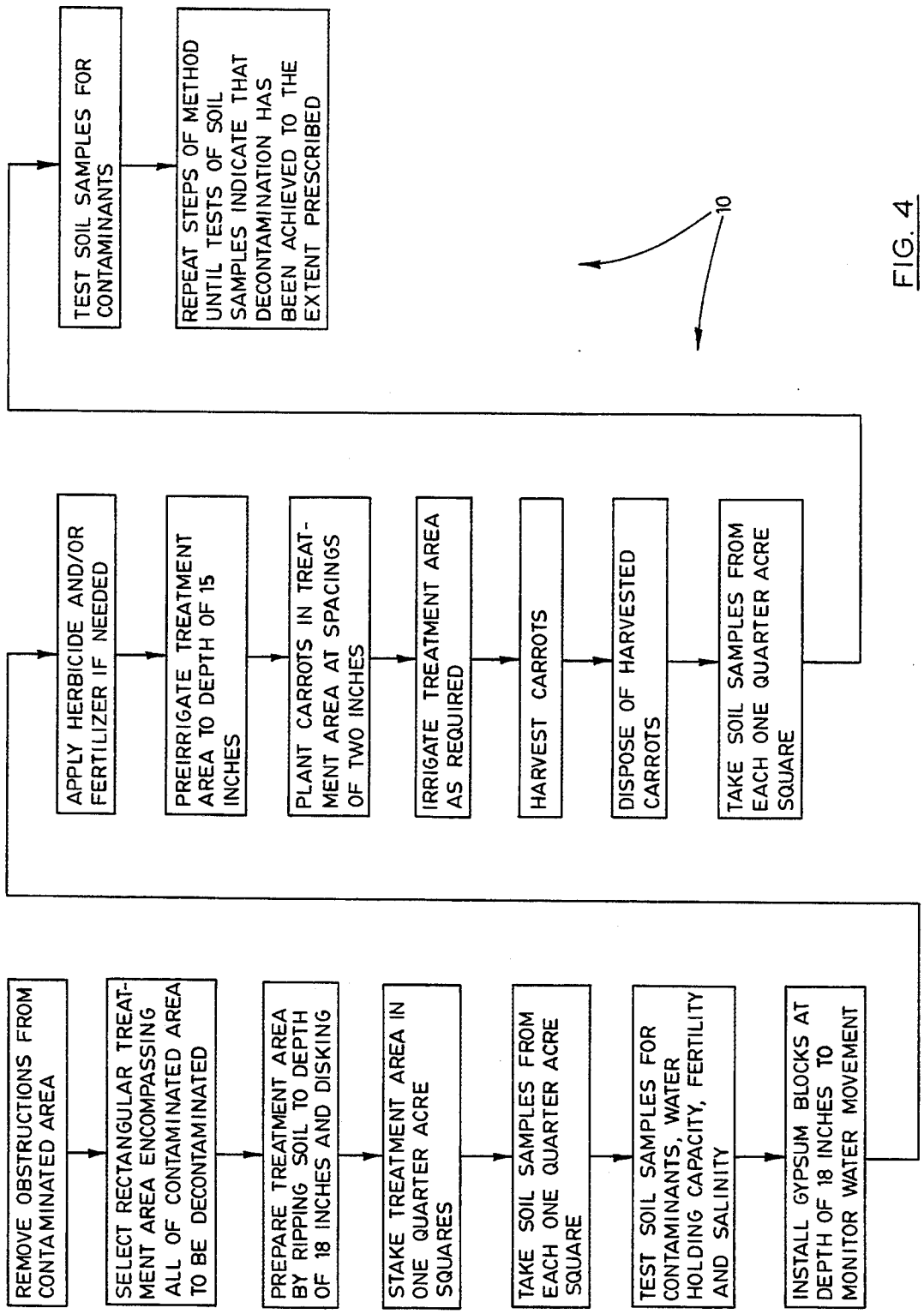
FIG. 4 is a schematic diagram of a series of steps employed in the practice of the method of the present invention.

Referring more particularly to the drawings, the steps of the first embodiment of the method of the present invention are generally indicated by the numeral 10 in FIG. 4. In order more clearly to understand the practice of the method, the earth or soil is indicated at 20 and the earth's surface at 21. It will be understood, as shown in FIGS. 1 and 2, that the earth's surface 21 represents a site covering many acres of land which has in some portion thereof, hereinafter to be identified, been contaminated with toxic substances. The contaminated area is indicated at 22 having a periphery 23. While the method of the present invention is operable to remove virtually any toxic, or nontoxic, substance from virtually any porus medium, it is particularly well suited to use in removing substances from soils. More specifically, it is particularly well suited to the removal of toxic substances from soils. For purposes of illustrating the practice of the method, it will be understood that the contaminated area 22 is contaminated with DDT and Toxaphene. It will also be understood that the particular location and exact configuration of the contaminated area 22 may not be known at the time of the initiation of the practice of the method thereon. In other words, the method of the present invention is operable to locate and precisely determine the configuration and boundaries of the contaminated area as an integral part of the practice thereof.

Similarly, it is frequently the case that such sites have buildings, concrete or asphalt emplacements and other obstructions. Therefore, a first step in the practice of the method of the present invention once the site is located is to remove all such obstructions from the immediate vicinity of the contaminated area prior to the practice of the method. Such obstructions can simply be disposed of, or where possible, preserved for return to the area once the practice of the method has been concluded.

Thereafter, a treatment area 24 is selected which encompasses the entire contaminated area 22 insofar as it has been identified to that point. As shown in FIG. 1, preferably the treatment area 24 has a rectangular periphery 25 described by a pair of parallel end boarders 26 and a pair of parallel side boarders 27 which are right angularly related to the end boarders 26. Thus, as shown in FIG. 1, the end and side boarders 26 and 27 are outwardly disposed relative to all portions of the periphery 23 of the contaminated area 22.

The treatment area 24 is then prepared for the practice of the method of the present invention by ripping the soil to a depth beneath that to which it is known by preliminary examination the contaminants in the soil have reached. This may be determined first by taking core samples in the contaminated area 22 to determine a maximum depth of contaminant penetration into the soil. Such ripping of the soil breaks the earth which may characteristically be highly compacted in such sites so as to form a relatively malleable mass throughout the treatment area 24. For example, in the practice of the method of the present invention heretofore performed, the maximum depth of penetration of the contaminants into the soil was determined preliminarily to be to a depth of 15 inches. The treatment area was then ripped to a depth of 18 inches so as to encompass all of the contaminated area to the depth of such contamination. Thereafter, the treatment area disked to transform the treatment area into an amorphous mass of soil suitable for growing a crop therein. If desired, the treatment area may then be leveled roughly to the desired plane.

Referring more particularly to FIG. 1, if the treatment area 24 is envisioned to be approximately six acres in size, the next step in the method calls for the treatment area to be demarked into a plurality of test areas hereinafter to be described. In the practice of the method, each acre of the six (6) acre treatment area is demarked into four (4) quarter acre test areas thereby, in effect, creating the grid shown in FIG. 1. Such demarking of the test areas is achieved by driving stakes 35 into the earth's surface 21 in the treatment area 24 in the positions and numbers desired to define, in the illustrative example, five (5) transverse courses 36 intersecting three longitudinal courses 37 thereby forming 24 substantially equally sized test areas or quarter acre squares 38.

Subsequently, a plurality of soil samples are taken from each test area 38. The soil samples are taken from extraction points 45 extending along courses interconnecting opposite corners of each test area so as to form, in effect, the X configuration 46, shown in FIG. 1. Only one such X configuration is shown in FIG. 1 solely for illustrative convenience. The soil samples are taken to a depth to which it is known the contaminants to be removed have penetrated into the soil and are taken in closely spaced relation labeling each so that their precise location within each test area is known. Subsequently, each soil sample is tested for contaminants, water holding capacity, fertility and salinity and the results tabulated. The tabulation of the results of these tests for all of the test areas 38 produces a profile of the treatment area indicating the precise location, configuration and depth of penetration of the contaminants within the contaminated area 22. The test results also indicate the concentration of the contaminants throughout the contaminated area. The tabulated results relating to water holding capacity, fertility and salinity are then used to determine the amount and frequency of irrigation to be performed in the practice of the method. The results also indicate whether or not the soil must be treated further to render it capable of growing plant life in accordance with the method of the invention.

Thereafter, a plurality of gypsum blocks, not shown, are installed in the earth at a depth known to be beneath the deepest area of penetration of the contaminants and in such numbers and at such locations sufficient to permit monitoring of water movement during the practice of the method. If the tests of the soil samples so indicate, the soil throughout the treatment area 24 is treated with suitable fertilizer as may be necessary to render the soil capable of growing plant life. Similarly, if necessary, a suitable herbicide may be applied to eliminate unwanted plant growth not consistent with the practice of the method of the present invention.

The treatment area 24 is then irrigated to the depth of the maximum penetration of contaminants in the contaminated area 22 indicated by the tests of soil samples. Such pre-irrigation of the treatment area can be performed by any desired means, but preferably, by a sprinkler system brought on to the treatment area for the purpose of practicing the method. The use of such sprinkler systems is preferred in that it allows a more even dispersal of water throughout the treatment area and in that the depth of penetration of such irrigation can more precisely be controlled. Determination of the depth of such irrigation is achieved by reference to the gypsum blocks using conventional practices not constituting part of the present invention.

The next step in the practice of the method of the present invention calls for plant life to be planted within and throughout the treatment area. A wide variety of plant life can be employed for this purpose. However, carrot plants 47 have been found uniquely well suited to this purpose. More specifically, the Scarlet Nantes variety of carrot plant has been found particularly effective in the practice of the method of the present invention. The carrot plants are preferably planted by seed in closely spaced relation in a multiplicity of closely spaced rows extending throughout the treatment area. A spacing of approximately two inches (2") is preferred. For illustrative convenience in referring to the drawings, each of the carrot plants 47 once grown has a carrot body 48 and foliage or tops 49. The rows of carrots are indicated at 50 and the ends of the rows of carrots at 51. Again, FIG. 1 shows only three such rows purely for illustrative convenience. In the practice of the method a sufficient number of rows would be planted to extend over the entire treatment area.

The seeds are allowed to germinate and to grow to maturity as in the conventional raising of carrots. Irrigation of the treatment area is performed as required to this end and, if necessary, a pesticide nontoxic to humans and animals may be employed to the extent required to permit the carrot plants to grow to maturity.

As the carrot plants 47 grow, the carrot bodies 48 absorb the contaminants from the soil as the natural result of their growth. Since the carrots extend to significant depth in the soil, such absorption takes place throughout the depth of the contamination within the soil. As illustrated in FIG. 2, since the carrot plants are side by side, as shown for illustrative convenience by the two carrot plants in FIG. 2, such absorption of the toxins from the soil is even throughout the treatment area and to a depth reaching the maximum depth of penetration of the contaminants within the soil. It has been discovered that the majority of such toxins are entrapped within the outer tissue layers of the carrot bodies 48 during such growth.

After the carrot plants 47 have reached maturity, they are harvested using conventional harvesters. Such harvesting extracts all of each carrot plant from the treatment area 24 leaving the soil in the treatment area free of plant life. If desired, the carrots may be tested to determine the quantity of contaminants therewithin. However, normally this is not necessary.

The harvested carrots are collected for disposal. Such disposal may be performed in a variety of ways most consistent with the needs of the operation involved. This may included incineration of the carrot plants or disposal in a toxic waste dump. In other instances, it may be desired to reduce the volume of material to be removed from the environment. This can be achieved by dehydrating the carrot plants such as simply by exposure to solar heat. The moisture content of mature carrot plants is approximately eighty-five percent (85%) water. The exposure to solar heat can reduce the moisture content to about ten percent (10%) if desired. The resulting dehydrated carrot plants are thus significantly smaller by volume and therefore more easily disposed. It has been found that such dehydration does not release the toxins therefrom, but only the moisture.

Another means of reducing the volume of contaminated material to be disposed of is by peeling the carrots using conventional peeling apparatuses. Since, as previously noted, the outer tissues of the carrot body contain the majority of the toxins absorbed from the soil, such peeling removes the majority of the toxins from the carrots. The peelings from this operation may then, for example, be incinerated to remove the toxins from the environment. The remainder of the carrot plants can then otherwise be disposed of as may be preferred under the circumstances.

Soil samples are then again taken from each test area 38 of the treatment area 24 at the points of extraction 45 within each test area and along courses in the X configuration 46 shown in FIG. 1 and previously discussed. The soil samples are then tested for contaminants to determine to what extent the level of contaminants within the soil has been reduced. In most instances, this level of contaminant reduction achieved with one carrot crop will not be sufficient to reach the predetermined level required. Where this is the case, the steps of the method are repeated to grow a second carrot crop, harvest the mature carrot plants and dispose of the harvested carrot plants as heretofore set forth.

The method is so repeated until the tests of the final soil samples indicate that the level of contamination has been reduced to that previously identified as the level to be reached. Since the prescribed level will be determined by considerations beyond the method of the present invention, the number of carrot crops grown to maturity and harvested in the practice of the method of the present invention will depend upon factors not constituting part of the method of the present invention. However, for purposes of illustration, it has been found that in some environments the prescribed levels of decontamination are reached after from 1 to 3 carrot crops are grown. In more severely contaminated areas, it may be necessary to grow 4 to 6 carrot crops before the prescribed level of the decontamination has been achieved.

SECOND EMBODIMENT

Figure 3:
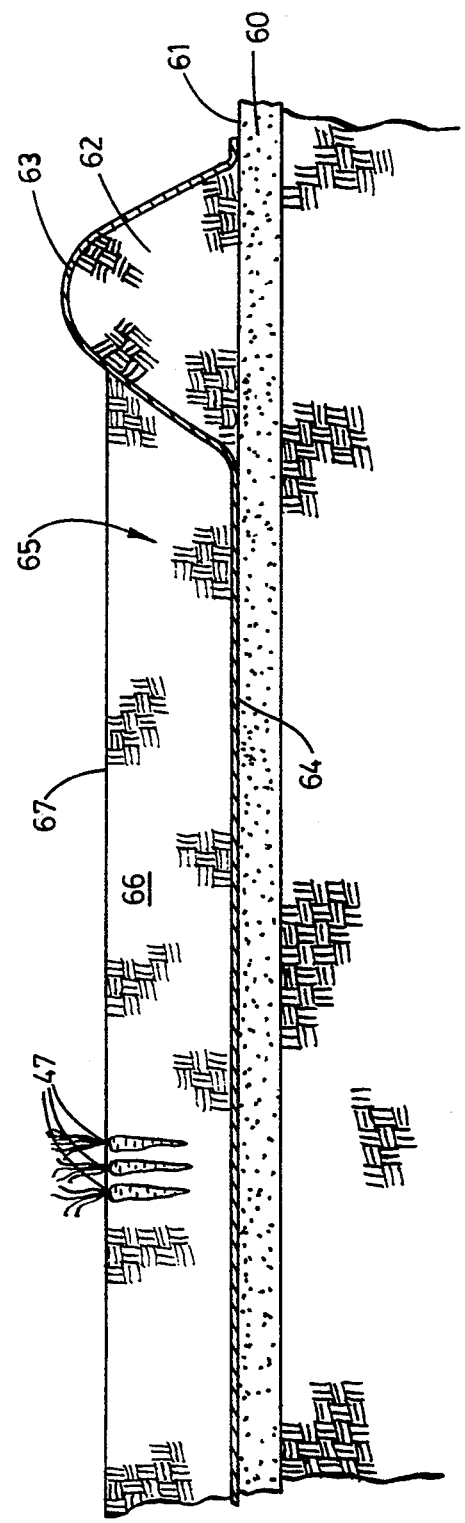
FIG. 3 is a fragmentary, vertical section of a site illustrating the practice of the second embodiment of the present invention wherein contaminated soils have been removed to a remote location for the practice of the method of the present invention.

The second embodiment of the method of the present invention is illustrated in FIG. 3. The second embodiment of the method of the present invention is employed where it is necessary or desirable to remove the contaminated soil from the site for treatment in the practice of the method of the present invention at a remote location. FIG. 3 illustrates such a remote location which may, for example, be a facility specifically designed for the purpose, or a location which otherwise is available and meets the requirements of the practice of the method of the second embodiment of the present invention. For illustrative convenience, the site may be envisioned as having an asphalt layer 60 having an upper surface 61 covering an area as large or larger than the area selected in the practice of the method of the present invention for performing the method. An earthen berm 62 is formed on the asphalt layer 60 describing, for example, a rectangular treatment area. The treatment area so described can be of any desired size. For illustrative convenience, it may be helpful to consider the treatment area as being a rectangle 20 feet by 40 feet (20' × 40').

A nylon reinforced hypalong rubber liner 64 is placed over the treatment area and the earthen berm so as to cover all of the earthen berm and the treatment area to form, in effect, a container sealed on its bottom and sides. The treatment area so defined is indicated by the numeral 65 in FIG. 3.

Contaminated soil 66 taken from the original site is thereafter deposited in the treatment area 65 and leveled so as to form a substantially uniform layer of contaminated soil within the treatment area 65 and preferably having a flat upper surface 67.

Thereafter, the contaminated soil is treated in the practice of the method of the present invention in the manner described in relation to the first embodiment of the method of the present invention heretofore set forth. It will be understood, however, that the method may be varied as desired to suit the particular circumstances. Since the treatment area 65 may be significantly smaller than that described in the illustrative embodiment of the first embodiment of the method of the present invention, it may be unnecessary to divide the treatment area into test areas equivalent to the test areas 38 of the first embodiment of the invention. Similarly, before planting of the first carrot crop, it may not be necessary to take soil samples since it is already known that all of the soil within the treatment area is contaminated and, if previously tested, what level of contaminants are present. However, after growing of the first carrot crop, the taking of soil samples along courses describing the X configuration 46 previously described is necessary to determine the level of decontamination achieved in the growing of the first crop. Similarly, testing after each successive crop is also desirable.

Once the prescribed level of decontamination is achieved, the soil can be returned to its original site or delivered to any other site desired.

Therefore, the method for removing a substance from a medium of the present invention has particular utility in the decontamination of soils and is operable inexpensively and dependably to achieve such decontamination evenly throughout a preselected treatment area; can be performed by personnel most of whom require little or no training; does not require the use of equipment specifically acquired for the performance of the method; and can be employed in situ or by removal of the contaminated medium to a remote location.

Although the invention has been herein shown and described in what is conceived to be the most practical and preferred embodiments, it is recognized that departures may be made therefrom within the scope of the invention which is not to be limited to the illustrative details disclosed.

Having described my invention, what I claim as new and desire to secure by Letters Patent is:

1. A method of removing contaminants from soil or the like, comprising the steps of
   selecting a treatment area at any location encompassing soil which is believed to contain contaminants to be removed;
   preparing the treatment area for planting by cultivating the soil therewithin, but without forming a barrier beneath said soil;
   demarking said treatment area into test areas covering substantially all of said treatment area;
   testing said test areas to locate the contaminants therewithin so as to determine the contaminated area of said treatment area containing the contaminants to be removed;
   growing carrot plants in said treatment area throughout the contaminated area in a multiplicity of closely spaced rows for the absorption of contaminants from the soil;
   harvesting substantially all of said carrot plants from the treatment area; and
   disposing of said carrot plants.

2. The method of claim 1 including the steps of
   testing said test areas after said harvesting step to determine the remaining level of contaminants therewithin;
   again growing carrot plants in said treatment area throughout the contaminated area capable of absorbing said contaminants from the soil;
   again harvesting substantially all of said carrot plants from the treatment area; and
   disposing of said carrot plants.

3. The method of claim 1 wherein said carrot plants are of the Scarlet Nantes variety.

4. The method of claim 1 wherein said disposing step includes drying said harvested carrot plants substantially to reduce the moisture content thereof.

5. The method of claim 1 wherein said disposing step includes removing said carrot plants from the environment after drying by incineration or by burial in a waste dump.

6. The method of claim 1 wherein said harvested carrot plants include carrots produced thereby and wherein the outer tissue of the carrots has absorbed the majority of said contaminants and said disposing step includes peeling said carrots to collect said majority of the contaminants, removing the peelings from the environment by incineration or burial in a waste dump and disposing of the remainder of the carrots by other means.

7. The method of claim 1 wherein said testing step includes taking soil samples in said test areas and assaying the samples so taken to identify the contaminants therewithin and the concentration thereof.

8. The method of claim 7 wherein said soil samples are taken in each of said test areas in a predetermined pattern.

9. The method of claim 8 wherein each of said test areas has a rectangular configuration and said predetermined pattern is substantially in the form of a pair of intersecting lines extending from positions adjacent to transversely related corners of said rectangular configuration.

10. The method of claim 9 wherein said soil samples are taken to depths of substantially about fifteen inches.

11. The method of claim 1 wherein said preparing step includes
    ripping the soil in said treatment area to a depth beneath said contaminants; and disking the soil to a condition suitable for growing carrot plants therewithin.

12. The method of claim 11 including prior to said growing step, the step of applying herbicide and/or fertilizer to the soil in said treatment area as required to grow said carrot plants.

13. The method of claim 12 including prior to said growing step, the step of irrigating said treatment area substantially to a depth including said contaminants therewithin.

14. The method of claim 1 wherein said demarking step includes driving stakes into the soil in said treatment area to define said test areas.

15. A method for removing contaminants from soil or the like, comprising the steps of removing said soil containing the contaminants from a first location and transporting said soil to a second location; growing carrot plants in said soil to absorb said contaminants into the carrot plants; removing the carrot plants and the carrots produced thereby from the soil; and disposing of the carrot plants and the carrots produced and thereby said contaminants absorbed thereby.

16. A method for the remediation in situ of soil bearing toxic substances, the method comprising the steps of selecting a treatment area at a site containing soil bearing toxic substances to be removed therefrom;

preparing the soil for planting by cultivating the soil to a predetermined depth, but without removal of the soil from the site or establishing a barrier or the like beneath the soil or by creating a path for fluid flow capable of causing fluid to flow through or beneath the soil to a particular location;

planting carrot plants by seed in the soil of said treatment area in a multiplicity of closely spaced rows extending through the treatment area at a spacing of substantially about two (2) inches;

growing said carrot plants substantially to maturity thereby extracting toxic substances from the soil into the outer tissue layers of the carrots produced by said carrot plants;

harvesting the carrot plants together with said carrots grown thereby by substantially complete removal thereof from said soil;

disposing of the harvested carrots; and testing soil samples from the treatment area to determine the reduction of the toxic substances borne by said soil.

* * * * *